United States Patent
Lee et al.

(10) Patent No.: US 6,469,254 B1
(45) Date of Patent: Oct. 22, 2002

(54) THERMISTOR ASSEMBLY HOLDING DEVICE

(75) Inventors: Timothy R. Lee, Amherst, NY (US); Johannes R. Tjahjadi, Broken Arrow, OK (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/924,854

(22) Filed: Aug. 8, 2001

(51) Int. Cl.$^7$ ................................................ H01B 17/00
(52) U.S. Cl. ................. 174/138 G; 174/72 C; 174/135; 174/152 G; 174/168; 174/169; 174/166 S
(58) Field of Search ............... 174/138 G, 72 C, 174/135, 152 G, 168, 169, 166 S; 361/600

(56) References Cited

U.S. PATENT DOCUMENTS

| | | | |
|---|---|---|---|
| 3,702,065 A | * 11/1972 | Jacobs | 62/158 |
| 4,420,738 A | 12/1983 | Rehmann et al. | 338/28 |
| 4,611,868 A | 9/1986 | Matsui et al. | 339/59 M |
| 4,924,350 A | * 5/1990 | Reddy et al. | 165/185 |
| 5,058,195 A | 10/1991 | Knepler | 392/442 |
| 5,294,050 A | 3/1994 | Hoffman et al. | 237/2 A |
| 5,417,400 A | 5/1995 | Arakawa | 248/323 |
| 5,606,150 A | * 2/1997 | Radliff et al. | 174/92 |
| 5,644,106 A | 7/1997 | Gajeski et al. | 174/138 G |
| 5,650,720 A | * 7/1997 | Brockmuller et al. | 324/173 |
| 5,821,864 A | * 10/1998 | Knop et al. | 340/620 |
| 6,002,437 A | * 12/1999 | Morioka et al. | 348/373 |
| 6,082,895 A | 7/2000 | Janicek | 374/185 |
| 6,091,317 A | 7/2000 | Lyle et al. | 338/28 |
| 6,188,307 B1 | 2/2001 | Katsuki et al. | 338/22 R |
| 6,189,268 B1 | * 2/2001 | Carr et al. | 52/220.7 |

OTHER PUBLICATIONS

Japenese application jp–2000–88984, published Mar. 31, 2000.*

* cited by examiner

*Primary Examiner*—Dean A. Reichard
*Assistant Examiner*—Jinhee Lee
(74) *Attorney, Agent, or Firm*—Patrick M. Griffin

(57) ABSTRACT

A thermistor assembly holding device includes a holder and locking mechanism. The holder is comprised of a first member and a second member. The first member includes a projection and the second member includes a receiving slot. When the projection is inserted into the receiving slot the first and second members are in a closed position and form a cavity. The thermistor assembly is received within the cavity. The holder is inserted into the locking mechanism that is coupled to an HVAC unit of an automobile. The locking mechanism includes a base and a locking plate with an aperture disposed throughout. A locking channel is disposed between the locking plate and the base. The locking channel receives a locking projection that is integrally formed with the first member. The locking projection in conjunction with a knob interacts with the locking mechanism to secure the holder to the HVAC unit.

15 Claims, 2 Drawing Sheets

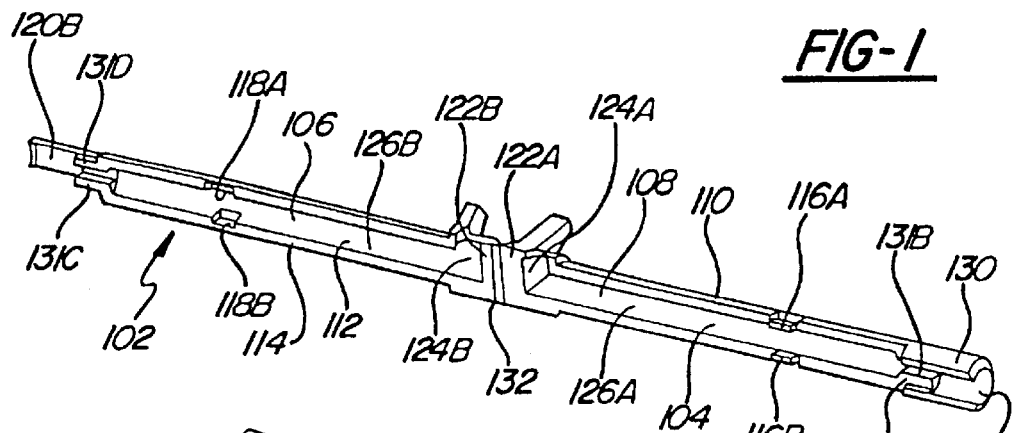
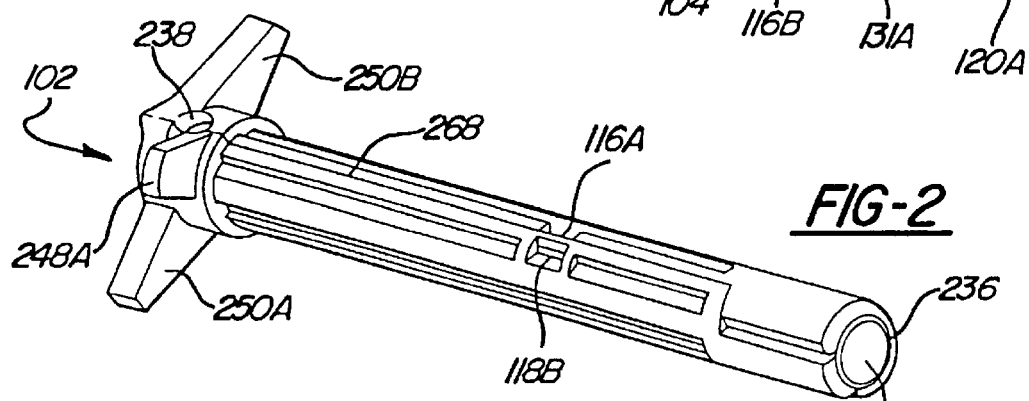
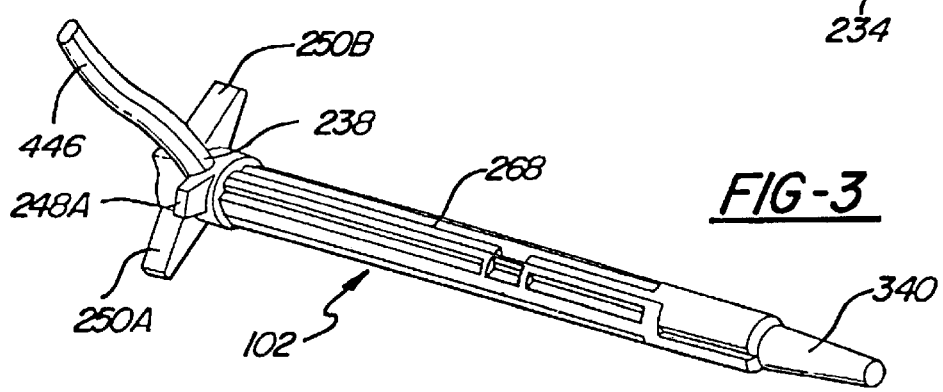
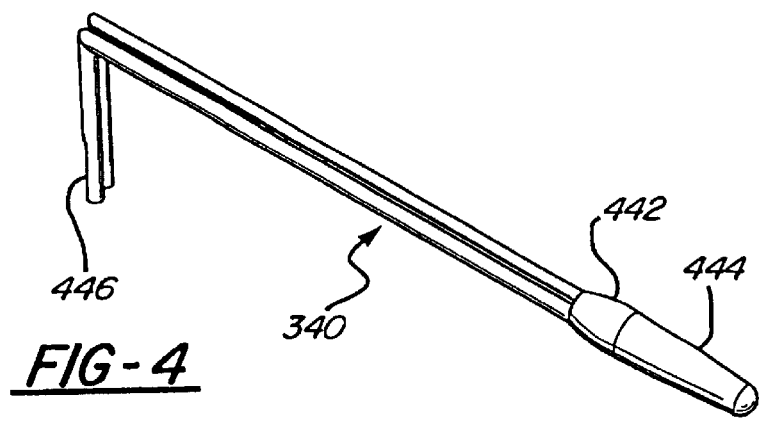

THERMISTOR ASSEMBLY HOLDING DEVICE

FIELD OF THE INVENTION

The present invention relates to holding devices for sensors, and more particularly relates to a thermistor assembly received within a plastic holder and secured to a module by a locking mechanism.

BACKGROUND OF THE INVENTION

Traditional automotive cooling systems include a compressor, a condenser and an evaporator. The compressor is a belt driven pump that is fastened to an engine. The compressor compresses and transfers refrigerant gas. It has an intake side and a discharge side. The intake side draws in refrigerant gas from the evaporator and discharges the refrigerant gas to the condenser. Hot, compressed refrigerant gas enters the top of the condenser and is cooled. As the gas cools it condenses and is discharged at the bottom of the condenser as a high-pressure liquid. The high-pressure liquid is converted to a low-pressure liquid and transferred to the evaporator. The evaporator receives the low-pressure liquid. Because of very low boiling points, warm air passing through the evaporator fins causes the refrigerant to boil. The boiling refrigerant absorbs large amounts of heat and is discharged to the compressor to repeat the cycle.

The evaporator must be maintained at a proper temperature to make the refrigerant liquid boil. For a typical refrigerant such as R12, the evaporator temperature should be 32° Fahrenheit or 0° Celsius. If the evaporator becomes too cold, the evaporator coil will freeze. A frozen evaporator coil will not absorb as much heat and the efficiency of the cooling system will be greatly reduced.

To maintain the proper temperature and prevent freezing of the evaporator coil, a control system in the automobile monitors the temperature of the evaporator. Traditionally, a sensor, such as a thermistor enclosed in a sensor case, is placed near the evaporator to measure the ambient air temperature surrounding the evaporator coil. The sensor transmits data to the control system through a cable. To maintain the sensor in the proper location during operation of the automobile, a clip is attached to the sensor case. The clip is then snapped into the evaporator core at a designated location.

The use of the clip to secure the sensor case in the proper position near the evaporator core has presented several problems. First, a large amount of force is required to push or snap the clip into the evaporator core. This poses an ergonomic issue when assembling the automobile HVAC unit during mass production. Secondly, to service or replace the sensor the entire cooling system must be disassembled to reach the sensor. This disadvantage requires costly repair services to replace a relatively inexpensive sensor. Thirdly, to properly locate the sensor in the cooling system, a gage is required to attach the clip to the sensor case. Again, this problem requires additional assembly time and is a burden in mass production. Finally, because the clip only secures the sensor, the cable used to transmit the measurements to the control system is exposed in the cooling system. Through the assembly process or normal use of the automobile the cable can be pinched or sliced open by the numerous parts of the cooling system. This problem causes damage to the overall operation of the system. The sensor could fail to transmit measurements, thereby allowing the evaporator coil to freeze.

Accordingly, we propose an alternative technique of attaching a sensor for measuring the temperature of ambient air surrounding an evaporator of a cooling system that permits easy installation in a manufacturing environment and prevents damage to the sensor.

SUMMARY OF THE INVENTION AND ADVANTAGES

The present invention includes a holder and a locking mechanism for securing a sensor assembly in a proper position in an HVAC unit. The holder includes two longitudinal members with channels disposed in each member. The channels of each member narrow at one end of the longitudinal member. The channels receive the sensor assembly including a thermistor and a cable. The longitudinal members also include a projection and a slot. When the projection is inserted into the slot the channels of the two longitudinal members form a cavity for receiving the sensor assembly, thereby encapsulating the sensor assembly. One end of the holder also includes a locking projection and a knob. The locking projection is utilized to secure the holder to the locking mechanism.

The locking mechanism is coupled to the side of the HVAC unit or cooling system. It includes a base and a locking plate with a locking channel disposed there between. The holder is received in an aperture disposed throughout the base and locking plate. The locking projection of the holder is received by the locking plate through an opening and secured in the locking channel. The knob is used to actuate a twist-and-lock feature of the locking mechanism.

An advantage of the present invention is that the sensor assembly is easily positioned and secured within the HVAC unit without the need for a gage or measuring device.

Another advantage of the present invention is that the holder and sensor can be easily removed from the HVAC unit without disassembling the entire unit.

A further advantage of the present invention is that the cable is secured within the holder thereby reducing the possibility for pinching or damaging the cable.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of the holder in an open position;

FIG. 2 is a perspective view of the holder in a closed position;

FIG. 3 is a perspective view of the holder with sensor assembly;

FIG. 4 is a perspective view of sensor assembly;

DETAILED DESCRIPTION OF THE PREFERRED EMBODIMENT

Figure 5:
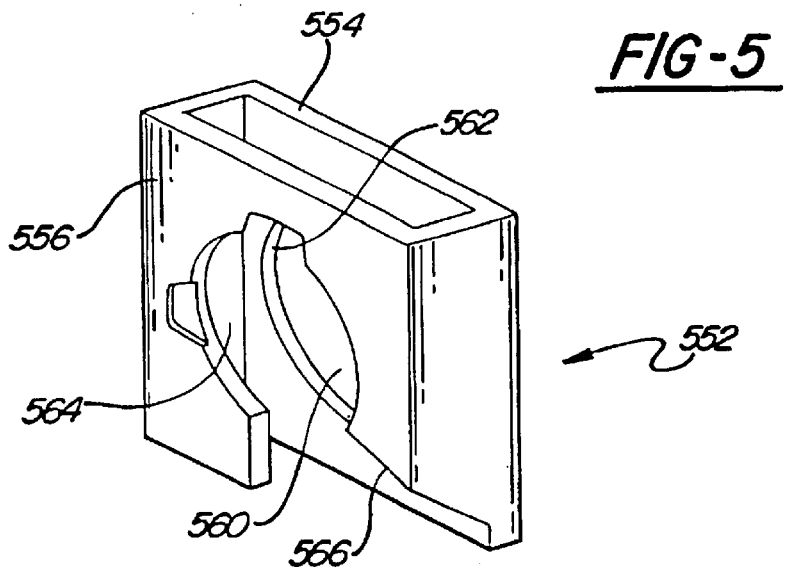
FIG. 5 is a perspective view of the locking mechanism.

Referring to the Figures, wherein like numerals indicate like or corresponding parts throughout the several views, a holder 102 is shown in an open position in FIG. 1. The holder 102 includes a first longitudinal member 104 and a second longitudinal member 106. The first longitudinal member 104 includes a first channel 108 and a first mating surface 110. The second longitudinal member 106 includes a second channel 112 and a second mating surface 114. Additionally, the first longitudinal member 104 has projections 116A–116B while the second longitudinal member 106 has receiving slots 118A–118B. The preferred embodiment illustrates the holder 102 having two projections 116A–116B and two receiving slots 118A–118B, however the invention can be accomplished with only one projection 116A–116B and one receiving slot 118A–118B. The invention can also be accomplished with using more than two projections 116A–116B and receiving slots 118A–118B, however the number of projections 116A–116B must correspond to the number of receiving slots 118A–118B. The greater number of projections 116A–116B and receiving slots 118A–118B provide more security for maintaining the holder 102 in a closed position.

The first longitudinal member 104 and second longitudinal member 106 each include an insertion end 120A–120B and a locking end 122A–122B. The first channel 108 and second channel 112 are generally L-shaped with each including a short arm 124A–124B and a long arm 126A–126B. The short arms 124A–124B of the first and second channels 108, 112 are near the locking ends 122A–122B. The long arms 126A–126B extend from the locking ends 122A–122B toward the insertion ends 120A–120B. Preferably, the long arms 126A–126B of the channels 108, 112 narrow in width near the insertion ends 120A–120B. The narrowing of the channels 108, 112 provide accurate positioning of a sensor assembly (see below) within the holder 102.

Additionally, the holder 102 includes a sleeve 130 at the insertion end 120A of the first longitudinal member 104. The insertion end 120B of the second longitudinal member 106 is inserted into the sleeve 130 to obtain a closed position of the holder 102. Each longitudinal member 104, 106 also includes extensions 131A–131D to secure the fit of the insertion end 120B of the second longitudinal member 106 into the sleeve 130 of the first longitudinal member 104. In the present embodiment each longitudinal member 104, 106 includes two extensions 131A–131D. However, a variety of different configurations could be utilized to secure a tight fit of the members 104, 106 while in the closed position.

As illustrated in FIG. 1, the preferred embodiment of the subject invention includes a hinge 132 positioned at the locking ends 122A–122B of the first and second longitudinal member 104, 106. The hinge 132 preferably permits one of the first or second longitudinal members 104, 106 to rotate about the hinge to contact the other first or second member 106 and create the closed position. The hinge 132 is a living hinge 132 created when the holder 102 is molded. Although the holder 102 is shown with the hinge 132, the subject invention can also be manufactured without connecting the first and second longitudinal members 104, 106. The living hinge 132, however, provides ease of manufacture and assembly of the holder.

As illustrated in FIGS. 2 and 3, the holder 102 obtains the closed position by inserting the projections 116A–116B into their corresponding receiving slots 118A–118B, inserting the insertion end 120B of the second longitudinal member 106 into the sleeve 130 of the first longitudinal member 104, and engaging the extensions 131A–131B of the first longitudinal member 104 with the extensions 131C–131D of the second longitudinal member 106. The projections 116A–116B and receiving slots 118A–118B positioned on the first longitudinal member 104 and second longitudinal member 106 mirror each other to connect together and place the holder 102 in the closed position. When in the closed position, the first mating surface 110 contacts the second mating surface 114 to create a cavity 234 formed by the first channel 108 and the second channel 112. The cavity 234 includes openings 236, 238 at the insertion end 120A–120B and the locking end 122A–122B, respectively. The holder 102, in the closed position, encapsulates a sensor assembly 340 best described in FIG. 4.

As shown in FIG. 4, the sensor assembly 340 includes a thermistor 442, a sensor case 444 and a cable 446. The thermistor 442 is enclosed in the sensor case 444. The cable 446 is connected to the thermistor 442 and extends from the sensor case 444.

As best shown in FIG. 3, when encapsulated in the holder 102, the sensor case 444 rests in the narrower section of the long arms 126A–126B of the channels 108, 112 and extends out the opening 236 at the insertion end 120A–120B. The cable 446 extends along the length of the long and short arms 126A–126B, 124A–124B and exits the holder 102 through the opening 238 at the locking end 122A–122B.

Again referring to FIGS. 2 and 3, the holder 102 includes a locking projection 248A and knobs 250A–250B. The locking projection 248A interacts with a locking mechanism further described below. The knobs 250A–250B assist in locking the holder 102 into the locking mechanism. Both the locking projection 248A and the knobs 250A–250B can be in any quantity. The preferred embodiment, as best seen in FIG. 3, includes two locking projections 248A–248B, a larger locking projection 248A and a smaller locking projection 248B and two knobs 250A–250B of equal size.

Figure 6:
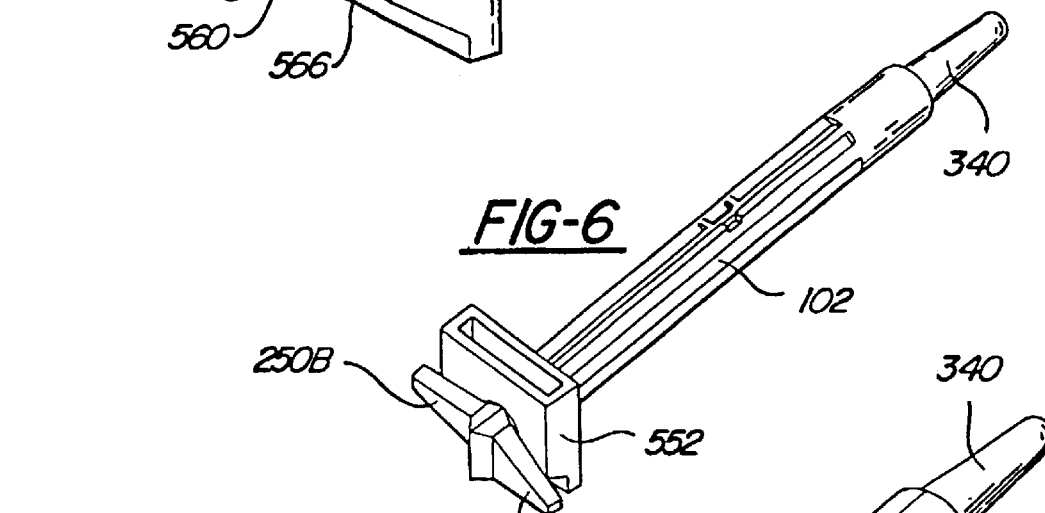
FIG. 6 is a perspective view of the holder in the locking mechanism.
Figure 7:
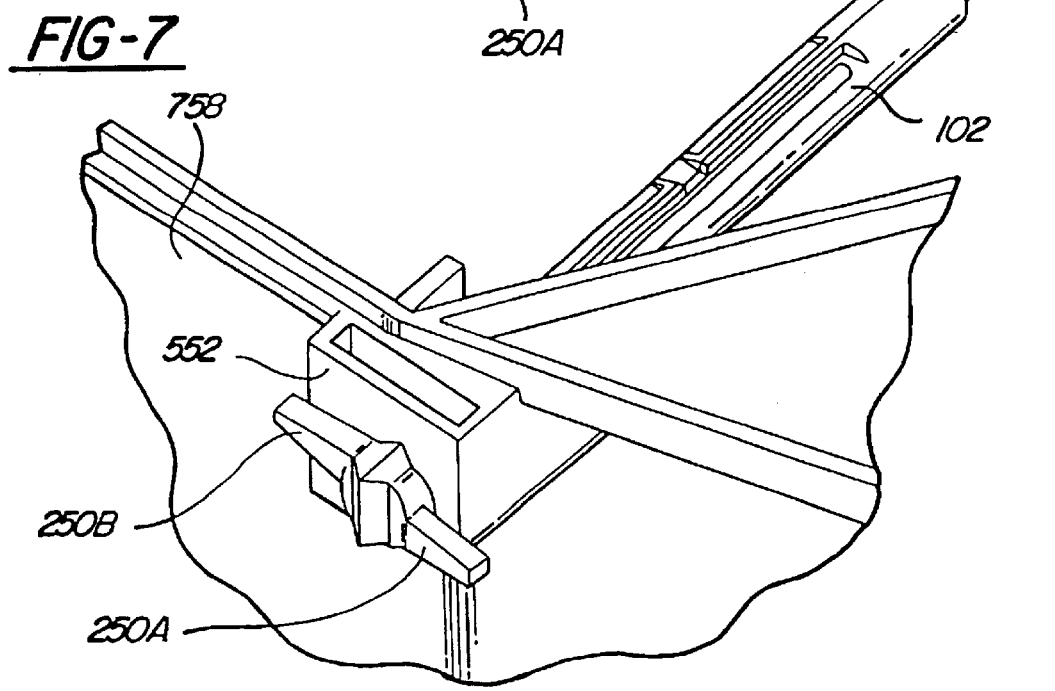
FIG. 7 is a perspective view of the holder engaged with the locking mechanism coupled to the module.

With reference to FIGS. 5 and 6, the locking mechanism introduced above is generally shown at 552. The locking mechanism 552 includes a base 554 and a locking plate 556. The base 554, as shown in FIG. 7, is coupled to a module 758. In the preferred embodiment, the module 758 is the side of an HVAC unit. However, the base 554 could be coupled to any item requiring the use of a holder 102 for a sensor assembly 340. The preferred embodiment also illustrates the base 554 integrally connected to the module 758. Again, a variety of techniques could be used for attaching the base 554 to the module 758 including fasteners or adhesive.

Referring again to FIGS. 5 and 6, the locking mechanism 552 includes an aperture 560 extending through the locking plate 556 and the base 554. The holder 102 is inserted through this aperture 560. The locking plate 556 includes an opening 562 for receiving the smaller locking projection 248A of the locking end 122 of the holder 102. The locking projection 248A is inserted into the opening 562 and enters a locking channel 564 disposed between the locking plate 556 and the base 554. With the use of the knobs 250A–250B, the holder 102 is rotated clockwise and both locking projections 248A–248B become trapped in the locking channel 564 beneath the locking plate 556. The locking channel 564 includes a stop 566 at one end for preventing the holder from over-rotating. As shown in the preferred embodiment, the features of inserting the smaller locking projection 248A into the opening 562 of the locking plate 556 and rotating the holder 102 clockwise are essential to the operation of the holder 102. Following this locking technique places the opening 236 at the insertion end 120 in a proper position for directing the cable 446 of the sensor assembly 340 away from the locking plate 556.

Finally, again with reference to FIG. 2, the holder 102 includes a plurality of ribs 268 used for strengthening.

Additionally, the holder 102 is made, in the preferred embodiment, from polypropylene in an injection molding process.

Obviously, many modifications and variations of the present invention are possible in light of the above teachings. The invention may be practiced otherwise than as specifically described within the scope of the appended claims. In addition, the reference numerals in the claims are merely for convenience and are not to be read in any way as limiting.

What is claimed is:

1. A holder for a thermistor assembly comprising:
    a first longitudinal member having a first locking end, a first insertion end, a first outer side, a first inner side, and a first channel disposed within the first inner side;
    a second longitudinal member having a second locking end, a second insertion end, a second outer side, a second inner side, and a second channel disposed within the second inner side; and
    a pivoting hinge connecting the first locking end to the second locking end wherein the first longitudinal member rotates about the pivoting hinge to contact the second longitudinal member thereby encapsulating the thermistor assembly.

2. A holder, as set forth in claim 1, further comprising a cavity formed by the first and second channels for receiving the thermistor assembly when the holder is in a closed position.

3. A holder, as set forth in claim 1, wherein the first longitudinal member includes a projection for securing the first longitudinal member to the second longitudinal member when the holder is in a closed position.

4. A holder, as set forth in claim 3, wherein the second longitudinal member includes a receiving slot for receiving the projection of the first longitudinal member.

5. A holder, as set forth in claim 1, wherein the first insertion end of the first longitudinal member includes a sleeve for receiving the second insertion end of the second longitudinal member when the holder is in a closed position.

6. A holder, as set forth in claim 1, wherein the first channel narrows at the first insertion end and the second channel at the second insertion end.

7. A holder, as set forth in claim 6, wherein the narrow first and second channels include a plurality of extensions for securing the longitudinal members when in a closed position.

8. A holder, as set forth in claim 1, wherein one of the first locking end and second locking end includes a locking projection.

9. A holder, as set forth in claim 8, further comprising a module for receiving the locking projection.

10. A holder, as set forth in claim 9, wherein one of the first locking end and second locking end includes a knob for use in attaching the holder to the module.

11. A holder, as set forth in claim 1, wherein the first longitudinal member and the second longitudinal member have a U-shaped cross-section.

12. A holder, as set forth in claim 1, wherein the first outer side and the second outer side include a plurality of ribs for strengthening the holder.

13. A holder, as set forth in claim 1, wherein the holder is made of polypropylene.

14. A holder, as set forth in claim 9, wherein the module is an HVAC unit in an automobile.

15. A holder, as set forth in claim 1, wherein the thermistor assembly includes a thermistor enclosed in a sensor case and coupled with a cable.

* * * * *